Patented May 11, 1937

2,079,633

UNITED STATES PATENT OFFICE 2,079,633

SYNTHETIC RESINS

Henry S. Rothrock, Wilmington, Del., assignor to E. I. du Pont de Nemours & Company, Wilmington, Del., a corporation of Delaware No Drawing. Application December 17, 1935, Serial No. 54,948

3 Claims. (Cl. 260—4)

This invention relates to synthetic resins, and more particularly to improvements in the manufacture of resins of the phenol-formaldehyde type.

Phenol condenses with formaldehyde to yield brittle, oil-insoluble resins of the novolac (non-hardening) or of the resol (hardening) type. They are therefore unsuitable for use in varnishes and other coating compositions, and their chief application heretofore has been in molding compositions. Because of the importance of phenol-aldehyde resins, and because of their outstanding durability and high luster, many attempts have been made to produce modifications which are oil-soluble. For example, among methods which have been developed for obtaining oil-soluble resins of this type are: (1) introduction of side chains into the ring to yield phenols such as tertiary butyl phenol which can be condensed with aldehydes, particularly formaldehyde, to yield oil-soluble resins, (2) etherification of phenolic hydroxyl groups, (3) hydrogenation of the resins, (4) inclusion in the reaction mixture of solubilizing or blending ingredients such as rosin, rosin glycerides, terpene derivatives, etc. Other methods of obtaining oil-soluble phenol-formaldehyde resins have been outlined in the prior art. New types of oil-soluble phenol-formaldehyde resins have also been developed by condensing certain selected types of phenols such as 2,2-bis(4-hydroxy-3-methylphenyl)dimethyl methane with formaldehyde, but these resins, being prepared from comparatively expensive and relatively unavailable phenols, are also relatively expensive. The use of rosin and other similar solubilizing or blending agents to obtain oil-soluble phenol-formaldehyde resins of the "Amberol" type is undesirable because it obscures the desirable phenolic properties of the phenol-formaldehyde resins. The use of fatty glycerides, etc., which condense at least partially with the resin, and the introduction of ether groups, are open to the same objection. Hydrogenation is a relatively expensive operation, and the products are not always sufficiently oil-soluble. Various methods of making phenol-formaldehyde resins have been proposed in which the phenol and formaldehyde are reacted in the presence of various solvents and catalysts. But the fact that oil-soluble, heat-hardening resins may be produced directly from formaldehyde and phenol by using the kind of catalysts and solvents disclosed herein has wholly escaped prior investigators.

From the foregoing will be seen the importance of developing a satisfactory method for making relatively highly condensed phenol-formaldehyde resins which, while retaining their property of heat-convertibility, have the added property of oil solubility. In addition, my new resins are of the low cost type by virtue of the fact that they are derived from phenol itself.

This invention has as an object a process for making oil-soluble, heat-hardening resins from formaldehyde and phenol which does not require the use of special modifying agents or solubilizing resin ingredients. A further object is the manufacture of improved phenol-aldehyde resins, and of coating compositions comprising such resins and drying oils or other film-forming materials.

These objects are accomplished by condensing phenol with formaldehyde in certain solvents and in the presence of certain mild acid catalysts, and combining the resin solutions thus obtained with drying oils, semi-drying oils, other resins, cellulose derivatives, etc.

I have discovered that oil-soluble, heat-hardening resins can be prepared from phenol and the cresols if the formaldehyde and phenol are condensed in the presence of both a mild acid catalyst and a completely volatile, non-gum-forming solvent selected from the class of monohydric aliphatic alcohols and mononuclear aromatic hydrocarbons. It is to be observed that these resins cannot be produced in the absence of a catalyst or in the presence of alkaline catalysts as, for instance, hexamethylenetetramine, calcium oxide, sodium hydroxide or of strongly acid catalysts, e. g., hydrochloric acid, or of salts of strong acids such as ferric chloride because these catalysts render the product insoluble in oil. Also, the improved resins described herein cannot be produced by replacing the solvents mentioned above with solvents of different kinds such as fatty oils, mineral spirits and other aliphatic hydrocarbons.

As the mild acid catalyst I prefer to use zinc acetate or boric acid although various other catalysts of like nature, such as copper acetate, may be used more or less satisfactorily.

The following examples are intended to be illustrative only of the various methods for practicing my invention:

Example I

Eleven hundred and twenty-eight grams (12 mols) of phenol, 928 grams of diisopropyl carbinol (8 mols), 360 grams (12 mols) of paraformaldehyde, and 8 grams (0.044 mol.) of zinc acetate were placed in a five-liter, round bottom, three-necked flask equipped with an efficient stirrer, an air condenser and a thermometer. Heat was applied and the temperature brought to 100° C. in 45 minutes. At this point the paraformaldehyde had essentially dissolved. The temperature was held at approximately 100° C. for 2 hours, then raised to 120° C. Heating was continued for 4 hours, the temperature being allowed to fall very gradually to 73° C., and the solution allowed to cool. The resulting clear liquid was separated from a small amount of water which had formed on the sides of the flask.

Films of the resin prepared as described above may be rendered insoluble and infusible by baking for a few minutes at about 130° C.

Varnishes were prepared from the solution, obtained as described above, as follows:

(1) To three hundred seven and five-tenths grams of the resin solution were added 245.4 grams of China-wood oil, and the mixture heated in an aluminum beaker to remove solvent and unchanged phenol. The temperature was then raised as rapidly as possible to 225° C. where it was held for 15 minutes. At about 160° C. a cooled sample of the solution remained clear on evaporation of residual solvent. A loss of 184 grams occurred during distillation, bringing the resulting varnish to approximately 25 gallons in oil length. The product was cut to a 50% solution in Hi-flash naphtha. A sample of this varnish containing 0.02% cobalt drier as cobalt linoleate (based on the oil content of the varnish) dried tack-free overnight. The dried film was hard, light-colored, had good body and high gloss, and showed excellent water and alkali resistance.

(2) Three hundred seven and five-tenths grams of the resin solution of Example I were mixed with 245.4 grams of castor oil. The mixture was heated in an aluminum beaker to 225° C. and held at this temperature for 5 minutes. During this operation a loss in weight of 172.5 grams occurred, due to distillation of solvent, thus bringing the resulting varnish to approximately 25 gallons in oil length. The product was soluble in toluene, and films thereof laid down on glass were clear after evaporation of solvent, indicating that the resin and castor oil were compatible.

*Example II*

A mixture of 94 grams (1 mol.) of phenol, 116 grams (1 mol.) of diisopropyl carbinol, 37.5 grams (1.25 mols) of paraformaldehyde, and 1 gram (0.0161 mol.) of boric acid was refluxed in an apparatus similar to that described in Example I, and the solution heated overnight at about 75° C. The resulting resin solution was clear except for a few drops of water on the bottom of the flask. A varnish was prepared from this resin solution as follows:

To twenty grams of resin solution was added 15 grams of China-wood oil, and the mixture heated quickly to 225° C. where it was held for 15 minutes. A loss in weight of 12 grams occurred, indicating the varnish to be about 25 gallons in oil length. The solution was cut to a 50% concentration with Hi-flash naphtha and 0.02% cobalt, as cobalt linoleate, drier (based on the oil) was added. Films flowed from this varnish solution were dust-free in one and one-half hours, and tack-free in less than sixteen hours. When 0.04% cobalt drier was added the films dried tack-free in two to three hours.

*Example III*

A mixture of 47 grams (0.5 mol.) of phenol, 50 grams (1.08 mols) of ethyl alcohol, 18.75 grams (0.625 mol.) of paraformaldehyde, and 0.5 gram (0.0028 mol.) of zinc acetate was heated at gentle reflux for 16 hours. The product was blended with drying oils in the same manner as described in Example II.

*Example IV*

Using the proportions of ingredients described in Example III but substituting a mixture of primary and secondary alcohols (boiling range 132-150° C.) comprising chiefly 2-methyl pentanol-1 and 2,4-dimethyl pentanol-3, for ethyl alcohol, an oil-soluble resin solution was obtained in the same manner as described in Example II.

*Example V*

Forty-seven grams (0.5 mol.) of phenol, 50 grams (0.68 mol.) of butyl alcohol, 22.5 grams (0.75 mol.) of paraformaldehyde, and 0.3 gram (0.0017 mol.) of zinc acetate were mixed and heated at 105° C. for 6 hours. The resulting resin solution was clear and could be combined with oil in the same manner as described in Example II.

*Example VI*

A mixture of 47 grams (0.5 mol.) of phenol, 18 grams (0.6 mol.) of paraformaldehyde, 50 grams (0.57 mol.) of diethyl carbinol, and 0.2 gram (0.0011 mol.) of zinc acetate was heated at 105° C. for 4 hours, then at 75–80° C. for 16 hours. The resulting solution was soluble in oil in the same manner as described in Example II.

*Example VII*

A mixture of 141 grams (1.5 mols) of phenol, 116 grams (1.26 mols) of toluene, 37.5 grams (1.25 mols) of paraformaldehyde, and 1 gram (0.0055 mol.) of zinc acetate was heated under reflux at about 110° C. in a flask as in the preceding examples. The mixture was then heated overnight at 87° C. On cooling, a clear solution was obtained, with traces of water on the sides of the flask. This solution was blended with China-wood oil and drier, as described in Example II, to make a 25-gallon varnish, films of which dried tack-free in 7 hours. The varnish was very alkali resistant, being unaffected by 24 hours' immersion in 5% sodium hydroxide solution.

The alcohol and aromatic hydrocarbon solutions of the resins obtained according to my invention may be blended with film-forming materials, e. g., cellulose derivatives such as ethyl cellulose, nitrocellulose, etc., vegetable oils such as drying oils and castor oil, and with oil-modified polyhydric alcohol-poly-carboxylic acid resins to produce coating compositions which are lustrous, clear, and alkali resistant. Films of the resins produced in accordance with the present invention heat-harden relatively rapidly at 130–150° C.

It should be observed, however, that in order to retain the oil-solubility characteristic of the resin the solvent in which the reaction is carried out should not be removed prior to blending with the oil inasmuch as the solid resins recovered by evaporation of the solvent are usually not directly soluble in oil.

Aqueous formaldehyde may be used instead of paraformaldehyde for obtaining the resins described in the foregoing examples. Other aldehydes known to be useful in the manufacture of phenolaldehyde resins may be used in place of the paraformaldehyde, but such aldehydes are usually less desirable because of the poorer durability of the resulting resins. My invention may be carried out by using mol. ratios of at least as high as 1.63 formaldehyde (based on the phenol present), but I generally prefer to use mol. ratios of about 1:1, or between 1:1 and 1.63:1, formaldehyde to phenol.

In place of the diisopropyl carbinol other aliphatic monohydric alcohols, e. g., isopropyl carbinol, isobutyl carbinol, amyl and iso-amyl carbinols, etc., may be used. Likewise, the toluene of Example VII may be replaced by other aromatic hydrocarbons, e. g., benzene, xylene, etc.

The present invention is especially useful in the production of oil-soluble, heat-hardening resins from phenol and formaldehyde as sole reactants. Replacement of the solvent used in the examples with mineral spirits, or other aliphatic hydrocarbon solvents, will form oil-insoluble resins. In fact, the presence of a substantial amount of aliphatic hydrocarbon in the solvent will prevent the formation of oil-soluble resins. I have also discovered that oil-insoluble resins result if the reaction between the phenol and formaldehyde is carried out in the presence of hydrochloric acid as the catalyst, even though the solvents required in the practice of the invention are used.

The resins of my invention are useful in all sorts of coating, impregnating, sizing, and molding compositions, adhesives, etc. For example, my resins are useful in combination with any one or more of the following: drying, semi-drying, and non-drying oils; cellulose derivatives such as nitrocellulose, ethyl cellulose, benzyl cellulose, etc.; natural and synthetic resins such as rosin, kauri, vinyl resins, other phenol-aldehyde resins, acrylic and methacrylic acid ester polymers, oil-modified polyhydric alcohol-polybasic acid resins, etc.; hydrogenated natural and synthetic resins such as hydrogenated phenol-aldehyde resins, hydrogenated rosin, hydrogenated rosin-modified phenol-aldehyde resins, etc.; hydrogenated rosin acid esters such as hydrogenated ester gum, etc.

To the compositions containing any of the above enumerated materials may be added pigments, fillers, driers, solvents, etc., as needed and desired. The varnishes obtained from my resins are useful as finishes for flexible fabric sheet materials.

The process disclosed herein is particularly valuable in that it makes it possible to synthesize oil-soluble heat-hardening resins from phenol itself. The importance of this advantage will be evidenced from the many observations of resin chemists in their descriptions of methods for preparing oil-soluble resins that the synthetic resins heretofore made from phenol are insoluble in oils. The present process makes it possible to produce from phenol oil-soluble phenol-aldehyde resins without the necessity of including in the reaction mixture, or in the final products, solubilizing or blending ingredients as heretofore has been necessary. My resins have wider applications than the specially modified oil-soluble phenol-formaldehyde resins previously used because they retain their 100% phenolic character and at the same time are oil-soluble, heat-hardening, and highly condensed. Moreover, my newly discovered process for blending oils, etc., with my new resins, while the latter are still in solution in solvents such as diisopropyl carbinol or toluol, is highly advantageous in that it makes it possible to prepare varnishes or other coating compositions directly from the reaction mixture.

As many apparently widely different embodiments of this invention may be made without departing from the spirit and scope thereof, it is to be understood that I do not limit myself to the specific embodiments thereof except as defined in the appended claims.

I claim:

1. A process for forming solutions of heat-hardening unmodified phenol-formaldehyde resin which are capable of being blended with fatty oil to produce a solution of said resin in the oil, said process comprising reacting as sole reacting ingredients phenol and formaldehyde in the presence of a catalyst consisting of a mild acid catalyst only and a solvent consisting essentially of a completely volatile solvent of the class consisting of monohydric aliphatic alcohols and mononuclear aromatic hydrocarbons, and continuing the heating in said solvent until a highly condensed resin is formed, said mild acid catalyst being one of the group consisting of zinc acetate, copper acetate, and boric acid.

2. A process for forming solutions of heat-hardening unmodified phenol-formaldehyde resin which are capable of being blended with fatty oil to produce a solution of said resin in the oil, said process comprising reacting as sole reacting ingredients phenol and formaldehyde in the presence of a catalyst consisting of a mild acid catalyst only and a solvent consisting essentially of a completely volatile solvent of the class consisting of monohydric aliphatic alcohols and mononuclear aromatic hydrocarbons, continuing the heating in said solvent until a highly condensed resin is formed, and blending the resulting solution of resin with a film-forming material other than said resin, said mild acid catalyst being one of the group consisting of zinc acetate, copper acetate, and boric acid.

3. The process set forth in claim 2 in which said film-forming material is fatty oil.

HENRY S. ROTHROCK.